(12) United States Patent
Hall (10) Patent No.: US 8,215,167 B2
(45) Date of Patent: Jul. 10, 2012

(54) SCOOP HAVING A PARKING ANCHOR FOR MEASURING AND DISPENSING POWDERED OR GRANULAR MATERIAL

(76) Inventor: Jacob Randy Hall, Draper, UT (US)

( * ) Notice: Subject to any disclaimer, the term of this patent is extended or adjusted under 35 U.S.C. 154(b) by 380 days.

(21) Appl. No.: 12/539,604

(22) Filed: Aug. 11, 2009

(65) Prior Publication Data

US 2010/0031747 A1 Feb. 11, 2010

Related U.S. Application Data

(60) Provisional application No. 61/087,764, filed on Aug. 11, 2008.

(51) Int. Cl.
*G01F 19/00* (2006.01)

(52) U.S. Cl. .......................................... 73/426; 220/735

(58) Field of Classification Search ..................... 73/426
See application file for complete search history.

(56) References Cited

U.S. PATENT DOCUMENTS

| | | |
|---|---|---|
| 1,694,119 A | 12/1928 | Frank |
| 3,679,093 A | 7/1972 | Chang |
| 3,722,779 A | 3/1973 | Chang |
| 5,706,974 A | 1/1998 | Murdick |
| 5,775,531 A | 7/1998 | Lowry |
| D416,438 S | 11/1999 | Molo |
| 6,604,645 B1 | 8/2003 | Vaupotic |
| D483,988 S | 12/2003 | Kipperman et al. |
| 7,168,461 B2 | 1/2007 | DeJonge |
| 7,175,041 B2 | 2/2007 | Ekkert |
| 2005/0035122 A1* | 2/2005 | Ekkert ........................ 220/212 |
| 2007/0102061 A1 | 5/2007 | Tsao |
| 2007/0138365 A1* | 6/2007 | Sarullo ...................... 248/311.2 |

* cited by examiner

*Primary Examiner* — Harshad Patel
*Assistant Examiner* — Roger Hernandez-Prewitt
(74) *Attorney, Agent, or Firm* — Angus C. Fox, III (57) ABSTRACT

A scoop for measuring and dispensing powdered or granular material has at least one projection, such as a fin, multiple intersecting fins, or a spike, which enable the scoop to be "parked" in the surface of a powdered or granular food product without the handle of the scoop coming in contact with the product. The projection is preferably molded unitary with the scoop and handle. Unless the container is vigorously shaken, dropped, or subjected to extreme accelerative or decelerative forces, the scoop will remain in its parked position until the container is reopened for a further dispensing of the powdered or granular food product. The scoop may be packaged as an assembly in combination with a discardable floating scoop retainer disk, that is placed on the surface of the granular or powdered product, and prevents the scoop from sinking below the surface during shipping and handling.

16 Claims, 10 Drawing Sheets

SCOOP HAVING A PARKING ANCHOR FOR MEASURING AND DISPENSING POWDERED OR GRANULAR MATERIAL

This application for patent has a priority based on the filing of provisional patent application No. 61/087,764, titled SCOOP HAVING AN ANCHORING FIN FOR MEASURING AND DISPENSING POWDERED OR GRANULAR MATERIAL, which was filed on Aug. 11, 2008.

BACKGROUND OF THE INVENTION

1. Field of the Invention

This invention relates to measuring and dispensing scoops for powdered and granular material and, more specifically, to a scoop designed to prevent the scoop handle from becoming buried in the powdered or granular material.

2. History of the Prior Art

Containers for powdered and granular materials are known. Many of these containers are cylindrical in configuration and incorporate lids to selectively seal an open top of a container. When such containers are used for materials having a powder or granular consistency, such as baby formula, flour, coffee, and the like, a scoop is sometimes included inside the container.

When the user desires to withdrawal a portion of the enclosed powdered or granular material, he must root around in the material with his fingers until the scoop is located. This process often is messy, soiling the user's hands and perhaps clothing or countertop. In addition, it is unsanitary, in that the user's hand contacts, and perhaps contaminates, the material to be dispensed.

A number of solutions have been proposed to prevent measuring scoops from becoming embedded in powdered or granular product stored within a container. One solution involves attaching the enclosed scoop to an upper portion of the container or container lid.

U.S. Patent Application Publication No. US 2007/0102061 A1 by inventor Charng-Shing Tsao discloses a receptacle for a measuring scoop which clips to the inner circular rim of the opening of a cylindrical container. A measuring scoop is sized to fit within the receptacle, thereby preventing it from contacting the powdered or granular material within the container.

U.S. Pat. No. 7,175,041 to Len Ekkert discloses a cap for a cylindrical container having retention ribs which secure a utensil, such as a scoop or spoon, to the upper inner surface of the cap.

U.S. Pat. No. 7,168,461 to Stuart W. DeJonge discloses a screw-on container lid that slides into a recess in the lid and sealably covers a pour aperture in the lid U.S. Pat. No. 6,619,230 B1 to Mark S. Kimbrough, et al. discloses a scoop having legs or a rear wall support which enables the scoop to be supported in an upright, level position.

U.S. Pat. No. 6,604,645 to Vladimir Vaupotic discloses a container lid having a cover portion adapted to extend over the mouth of the container, and an implement adapted to remove the container's contents coupled to the container lid via a frangible hinge.

U.S. Pat. No. D483,988 to Stuart R. Kppperman, et al. discloses a cap for a container having retention clips on an upper inner surface thereof. A scoop is provided that engages the retention clips.

U.S. Pat. No. D416,438 discloses a molded or stamped sheet-metal container lid having a domed scoop retainer with a central slot in which the handle of a scoop can be retained with interference fit.

U.S. Pat. No. 5,775,531 to James W. Lowry discloses a container for powdered or granular product having a measuring cup the bottom of which is detachably secured to the underside of the container lid.

U.S. Pat. No. 5,706,974 to Brian K. Murdick, et al. discloses a lid for a container having a resiliently deformable scoop retention socket integral with the container lid. The scoop is sized so that it fits into the socket with an interference fit so that the scoop is held above the powdered or granular material within the container.

U.S. Pat. No. 3,722,779 to Henry M. Chang discloses a food container having a spoon or scoop secured to a lower surface of a peel-away cover.

U.S. Pat. No. 3,679,093 to Henry M. Chang discloses a food container having a two-layer cover, the lower layer of which is permanently adhered to the container body and has a depressed recess or trough therein housing an implement, such as a spoon, for extracting the contents of the container.

U.S. Pat. No. 1,694,119 to Jacob Frank discloses a container for granulated or ground commodities having a pour-out opening through which the contents of the container can be sifted, and a cap in the shape of a measuring spoon or scoop that can be used to seal the opening.

Although many of the heretofore described inventions are capable of solving the problem of preventing a scoop from becoming embedded within the granular or powdered product stored within a container, the costs associated with providing both a unique scoop and a unique container lid or cover may make such solutions prohibitively costly in markets for extremely price sensitive products. The use of a scoop retainer in the lid or on the edge of the container also requires the user to reattach the scoop after it is used. The least bit of complexity, difficulty or investment of time associated with reattaching the scoop will result in many users ignoring the attachment step altogether, and simply throwing the scoop onto the container on top of the powdered or granulated product.

SUMMARY OF THE INVENTION

The present invention provides a simple and inexpensive solution to the problem of a scoop, and particularly the handle of the scoop, becoming embedded in the granular or powdered material within a container in which the scoop is also enclosed. An otherwise conventional scoop is provided with at least one projection, such as a fin, multiple intersecting fins, or a spike, which enable the scoop to be "parked" in the surface of the powdered or granular material without the handle of the scoop coming in contact with the material. The projection is preferably molded unitary with the scoop and handle. Unless the container is vigorously shaken, dropped, or subjected to extreme accelerative or decelerative forces, the scoop will remain in its parked position until the container is reopened for a further dispensing of the powdered or granular product. A first embodiment of the new scoop has a single, downward-projecting fin which lies in a vertical plane passing through the central axis of the scoop and center of the scoop handle. A second embodiment of the new scoop has a single fin similar to that of the first embodiment, but rotated 90 degrees about the central axis of the scoop. A third embodiment of the new scoop has three fins which intersect at the central axis of the scoop. A fourth embodiment of the new scoop has four fins which intersect at the central axis of the scoop. A fifth embodiment of the new scoop has a single, forward-projecting (i.e., in a direction diametrically opposed to the scoop handle) fin which lies in a vertical plane passing through the central axis of the scoop and center of the scoop handle projects. A sixth embodiment of the new scoop has a single forward-projecting fin which lies in a horizontal plane. A seventh embodiment of the new scoop has a downward-projecting spike that is centered about the central axis of the scoop.

Another aspect of the present invention is the provision of a floating scoop retainer disk, to which the scoop is secured during shipping and handling. The disk preferably has a diameter that is slightly smaller than the mouth of the container. The more nearly the diameter of the disk approaches that of the container, the less likely granulated or powered products are to cover the disk during shipping and handling. When the container is opened by the end user, the floating scoop retainer disk and scoop assembly can be removed from the container, the scoop removed from the retainer disk, and the retainer disk discarded. Thereafter, the scoop can be parked using its downward projection or fin within the granulated or powdered product while the container is stored with the lid secured on pantry shelves. Three embodiments of the floating scoop retainer disk are disclosed. The first, which is molded or stamped from a food-compatible semi-flexible polymer material, has a scoop outline cutout therein. The flexible nature of the disk allows it to be distorted in order to install the scoop within the outline cutout. The second embodiment, which is molded or vacuum formed preferably from a food-compatible polymer material, has a recess in which the scoop rests. The third embodiment, which is molded or stamped from flexible polymeric material, has a cutout for the cup portion of the scoop and a bendable loop which secures the scoop handle.

DETAILED DISCLOSURE OF THE INVENTION

The present invention provides a simple and inexpensive solution to the problem of a scoop, and particularly the handle of the scoop, becoming embedded in the granular or powdered material within a container in which the scoop is also enclosed. An otherwise conventional scoop is provided with at least one projection, such as a fin, multiple intersecting fins, or a spike, which enable the scoop to be "parked" in the surface of the powdered or granular material without the handle of the scoop coming in contact with the material. Unless the container is vigorously shaken, dropped, or subjected to extreme accelerative or decelerative forces, the scoop will remain in its parked position until the container is reopened for a further dispensing of the powdered or granular product. The projection is preferably molded unitary with the scoop and handle preferably from thermo-plastic resins, such as (polyethylene terephthalate (PET), high-density polyethylene (HDPE), low-density polyethylene (LDPE), polypropylene (PP), and polystyrene (PS). The various embodiments of the new improved scoop will now be described in detail, with reference to the attached drawing figures.

Figures 1, 2, 3, 4:
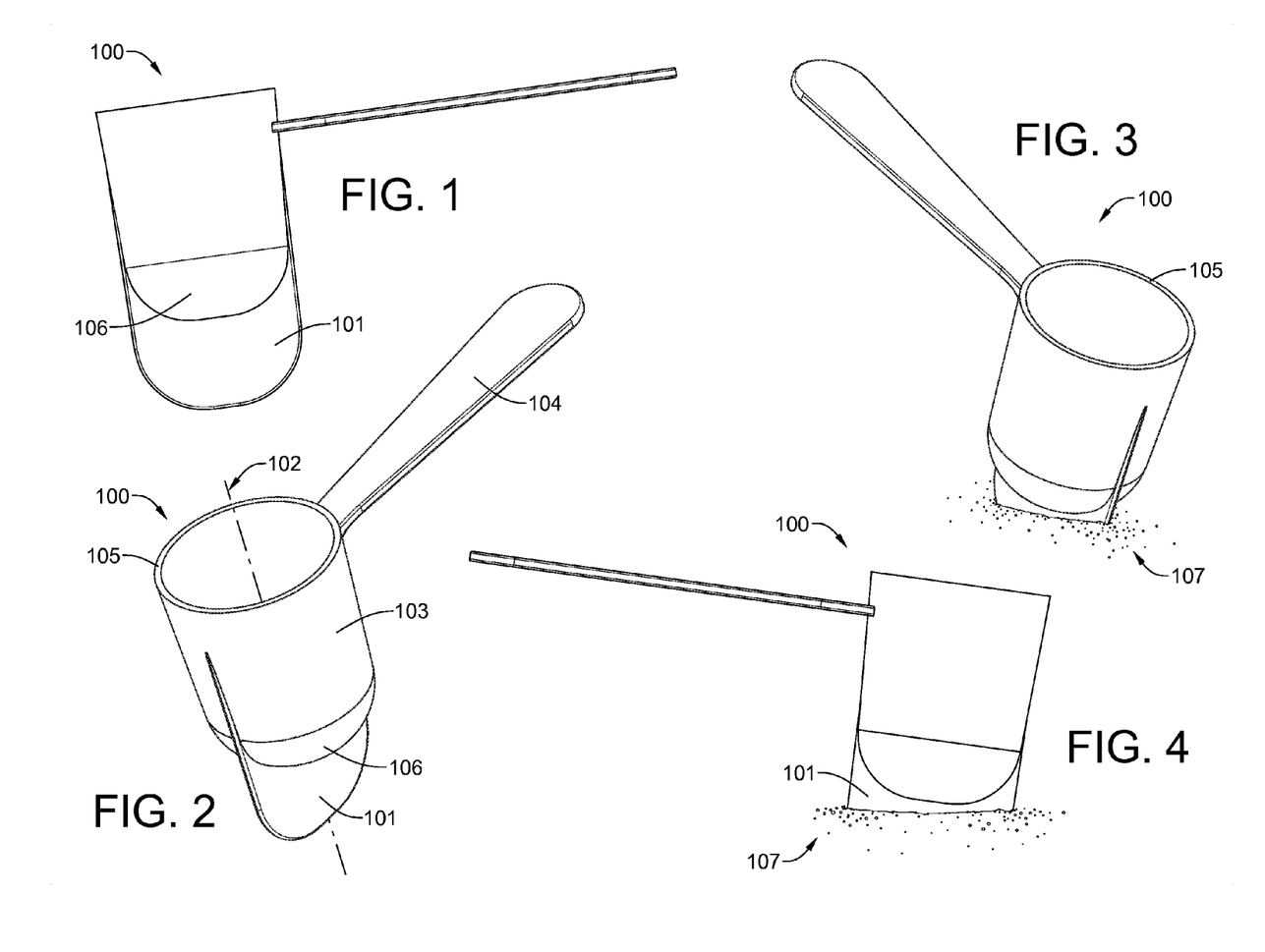
FIG. 1 is a left-side elevational view of a first embodiment parkable scoop.
FIG. 2 is an isometric view of the first embodiment parkable scoop from a top-front-left-side vantage point.
FIG. 3 is an isometric view of the first embodiment parkable scoop from a top-front-left-side vantage point parked in a granular or powdered product.
FIG. 4 is a right-side elevational view of the first embodiment parkable scoop parked in a granular or powdered product.
Figure 5:
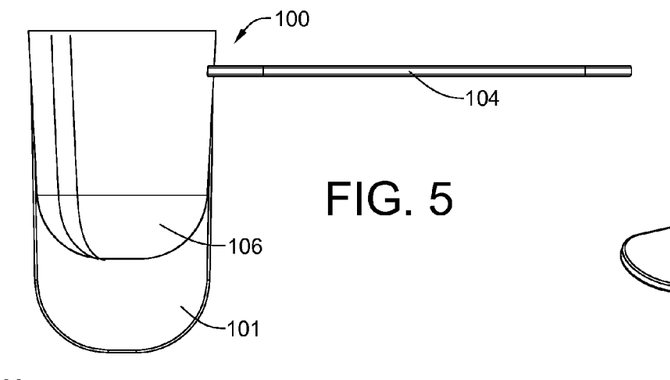
FIG. 5 is a left-side elevational view of the first embodiment parkable scoop.
Figure 6:
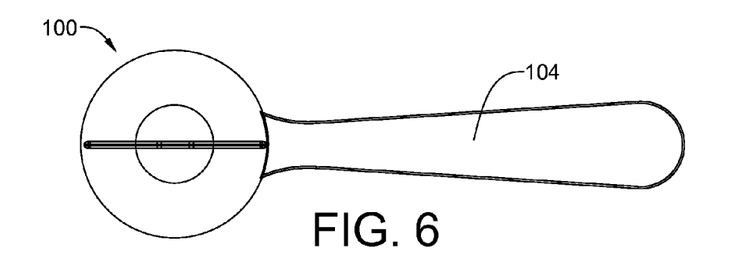
FIG. 6 is a bottom plan view of the first embodiment parkable scoop.
Figure 7:
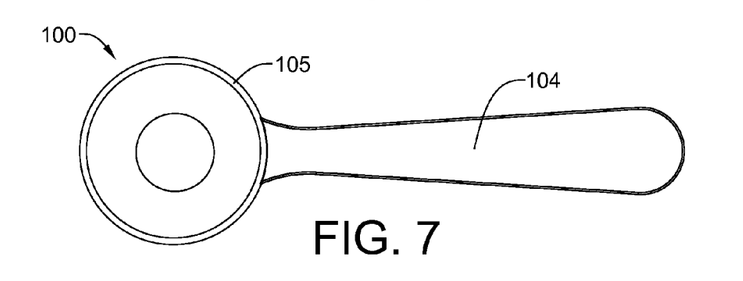
FIG. 7 is a top plan view of the first embodiment parkable scoop.
Figure 8:
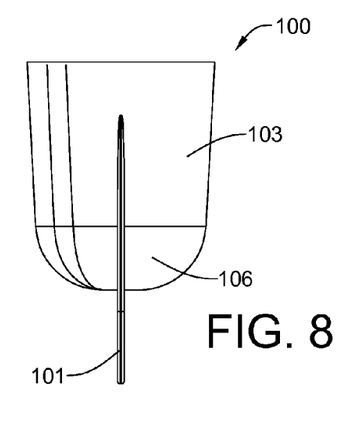
FIG. 8 is a front elevational view of the first embodiment parkable scoop.
Figure 9:
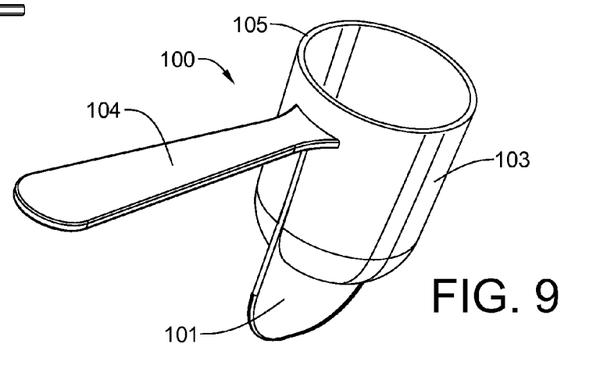
FIG. 9 is an isometric view of the first embodiment parkable scoop from a top-rear-right-side vantage point.
Figures 10, 11, 12, 13, 14:
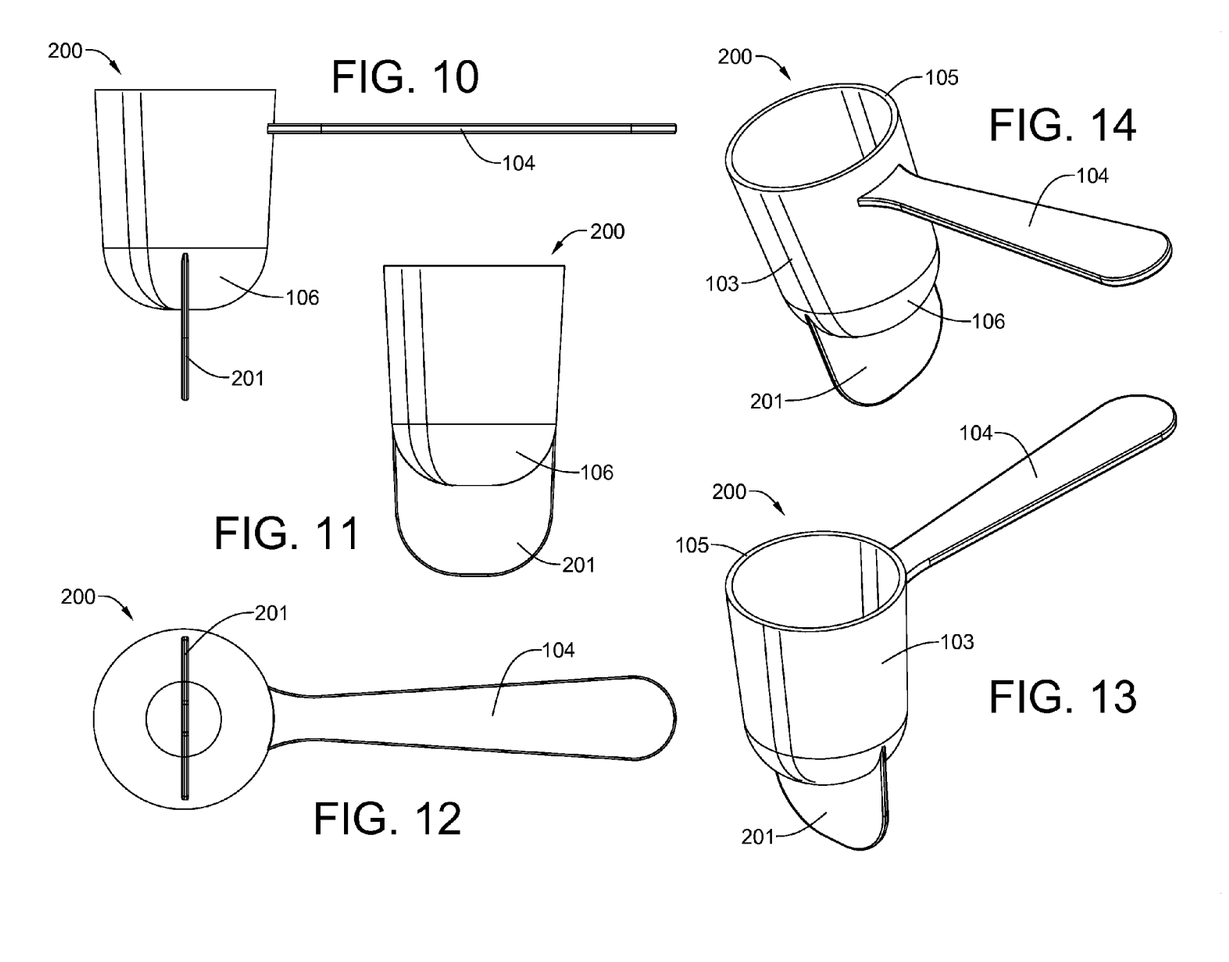
FIG. 10 is a left-side elevational view of a second embodiment parkable scoop.
FIG. 11 is a front elevational view of the second embodiment parkable scoop.
FIG. 12 is a bottom plan view of the second embodiment parkable scoop.
FIG. 13 is an isometric view of the second embodiment parkable scoop from a top-front-left-side vantage point.
FIG. 14 is an isometric view of the second embodiment parkable scoop from a top-rear-left-side vantage point.
Figures 15, 16, 17, 18, 19:
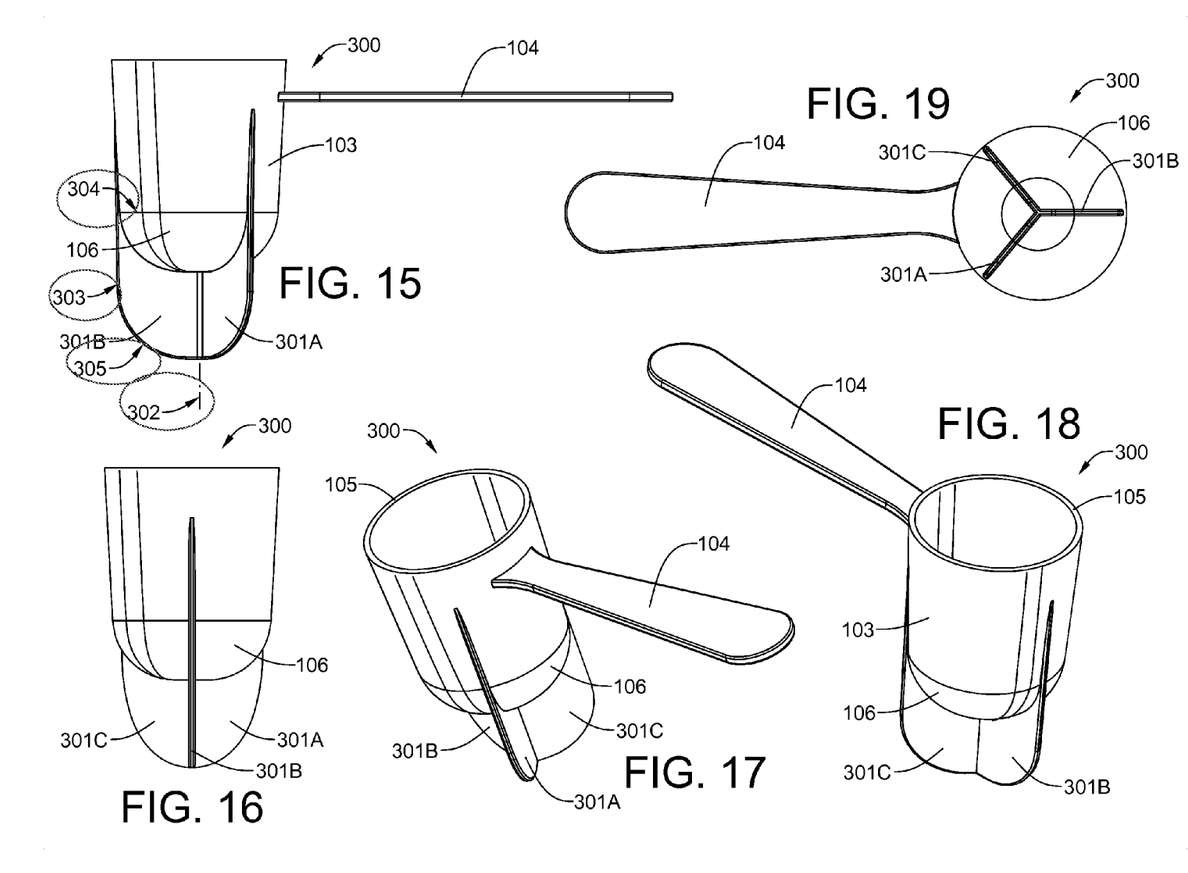
FIG. 15 is a left-side elevational view of a third embodiment parkable scoop.
FIG. 16 is a front elevational view of the third embodiment parkable scoop.
FIG. 17 is an isometric view of the third embodiment parkable scoop from a top-rear-left-side vantage point.
FIG. 18 is an isometric view of the third embodiment parkable scoop from a top-front-left-side vantage point.
FIG. 19 is a bottom plan view of the third embodiment parkable scoop.
Figures 20, 21, 22, 23, 24, 25:
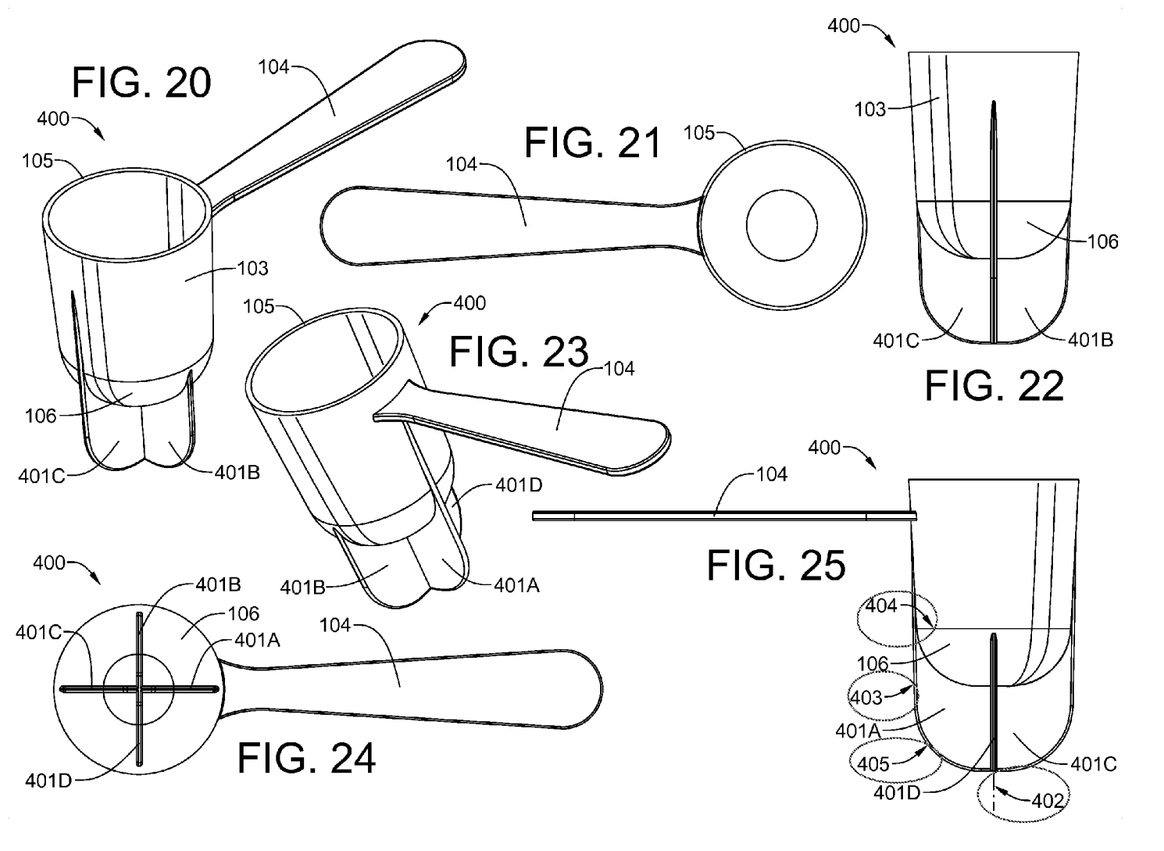
FIG. 20 is an isometric view of a fourth embodiment parkable scoop from a top-front-left-side vantage point.
FIG. 21 is a top plan view of the fourth embodiment parkable scoop.
FIG. 22 is a front elevational view of the fourth embodiment parkable scoop.
FIG. 23 is an isometric view of the fourth embodiment parkable scoop from a top-rear-left-side vantage point.
FIG. 24 is a bottom plan view of the fourth embodiment parkable scoop.
FIG. 25 is a right-side elevational view of a fourth embodiment parkable scoop.

Referring now to FIGS. 1 through 9, a first embodiment scoop 100 has a single, downward-projecting generally laminar fin 101 which lies in a vertical plane passing through the central axis 102 of the cup portion 103 and center of the handle portion 104. The fin 101 is thin, having approximately the same thickness as the cylindrical wall 105 and dome-shaped floor 106, which together comprise the cup portion 103 of the scoop 100. The scoop 100, including the fin 101, the cup portion 103, and the handle portion 104, is preferably injection molded as a single integral unit from a thermo-plastic polymeric compound. The fin 101 adds very little to total raw material cost of the scoop. Specifically FIGS. 3 and 4 show the first embodiment scoop 100 "parked" in a granular or powdered product 107.

Referring now to FIGS. 10 through 14, a second embodiment scoop 200 has a single fin 201 similar to that of the first embodiment, but rotated 90 degrees about the central axis of the scoop.

Referring now to FIGS. 15 through 19, a third embodiment scoop 300 has three generally laminar fins 301A, 301B and 301C (301 generally), which intersect at the central axis 302 of the scoop 300.

It will be noted that for the third embodiment scoop 300, an outermost edge 303 of each laminar fin 301 projects downward in a generally vertical direction from an outer perimeter 304 of the cup portion 103, and then transitions to a lower-most point thereof, which is adjacent the central axis 302 with a single convex curve 305.

Referring now to FIGS. 20 through 25, a fourth embodiment scoop 400 has four generally laminar fins 401A, 401B, 401C and 401D (401 generally), which intersect at the central axis 402 of the scoop 400.

It will be noted that for the fourth embodiment scoop 400, an outermost edge 403 of each laminar fin 401 projects downward in a generally vertical direction from an outer perimeter 404 of the cup portion 103, and then transitions to a lower-most point thereof, which is adjacent the central axis 402 with a single convex curve 405.

Figures 26, 27, 28, 29:
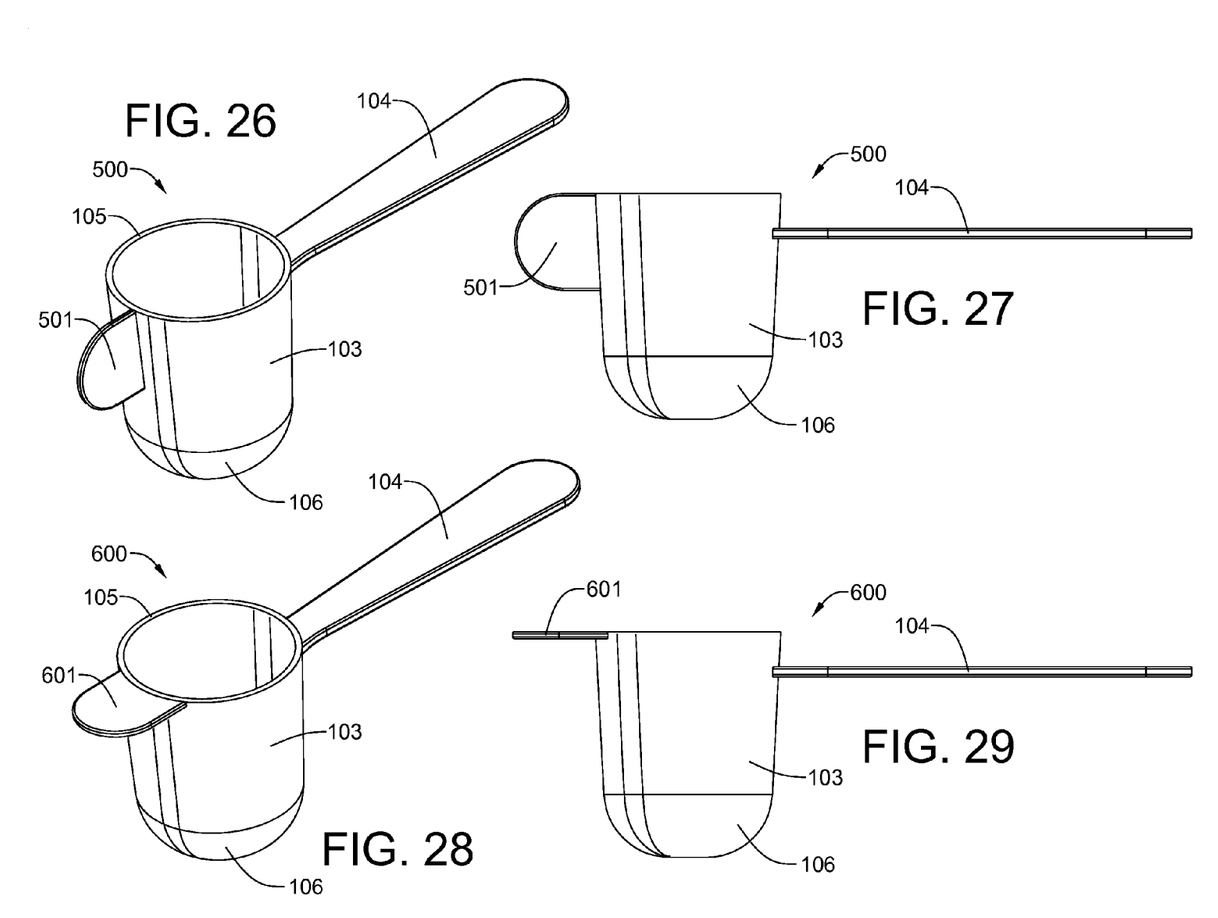
FIG. 26 is an isometric view of a fifth embodiment parkable scoop from a top-front-left-side vantage point.
FIG. 27 is a left-side elevational view of the fifth embodiment parkable scoop.
FIG. 28 is an isometric view of a sixth embodiment parkable scoop from a top-front-left-side vantage point.
FIG. 29 is a left-side elevational view of the sixth embodiment parkable scoop.
Figures 30, 31, 32, 33, 34, 35:
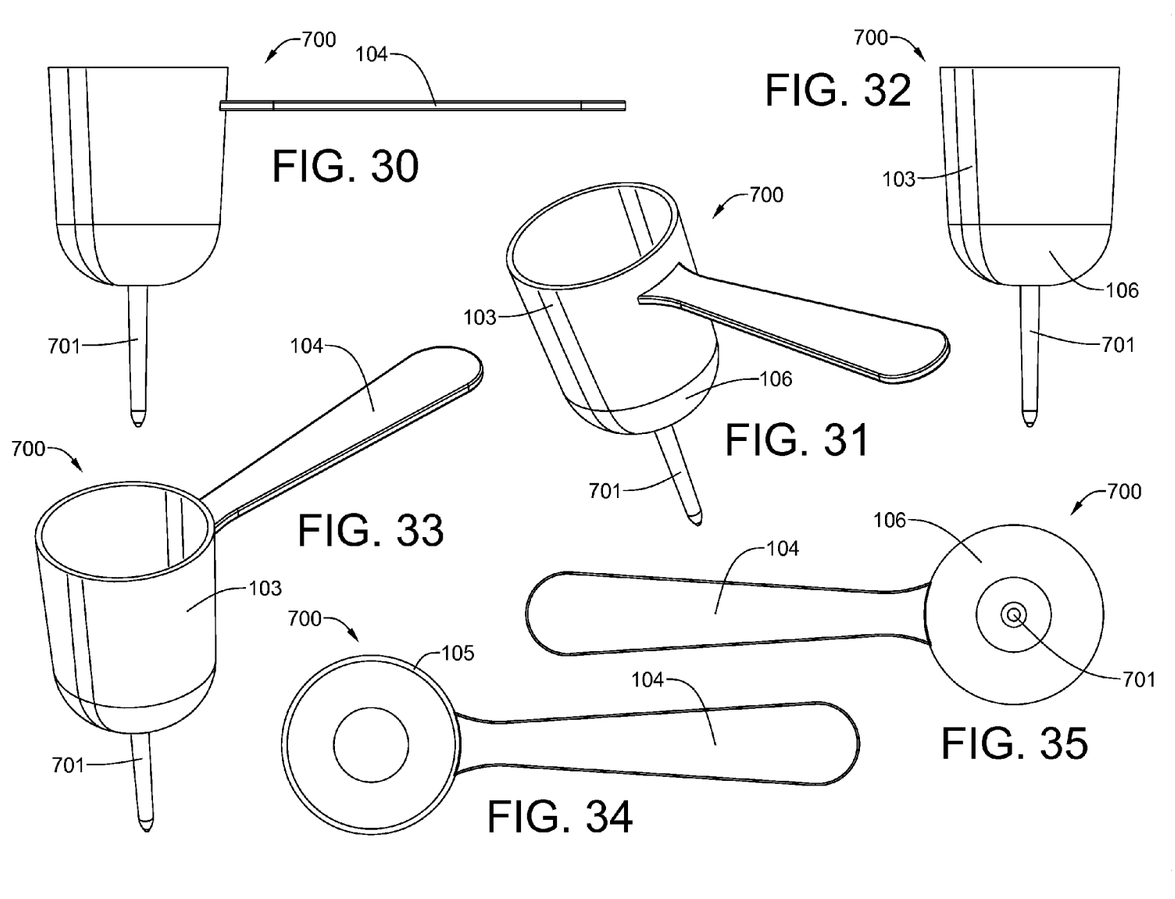
FIG. 30 is a left-side elevational view of a seventh embodiment parkable scoop.
FIG. 31 is an isometric view of the seventh embodiment parkable scoop from a top-rear-left-side vantage point.
FIG. 32 is a front elevational view of a seventh embodiment parkable scoop.
FIG. 33 is an isometric view of the seventh embodiment parkable scoop from a top-front-left-side vantage point.
FIG. 34 is a top plan view of the seventh embodiment parkable scoop.
FIG. 35 is a bottom plan view of the seventh embodiment parkable scoop.

Referring now to FIGS. 26 and 27, a fifth embodiment scoop 500 has a single, forward-projecting (i.e., in a direction diametrically opposed to the scoop handle) fin 501 which lies in a vertical plane passing through the central axis 502 of the scoop 500 and center of the scoop handle 503 projects.

Referring now to FIGS. 28 and 29, a sixth embodiment scoop 600 has a single forward-projecting fin 601 which lies in a horizontal plane.

Referring now to FIGS. 30 through 35, a seventh embodiment scoop 700 has a downward-projecting spike 701 that is centered about the central axis 702 of the scoop 700.

Another aspect of the present invention is the provision of a floating scoop retainer disk, to which the scoop is secured during shipping and handling. The disk preferably has a diameter that is slightly smaller than the mouth of the container. The more nearly the diameter of the disk approaches that of the container, the less likely the disk will sink into a granulated or powered product during shipping and handling. The floating scoop retainer disk can be injection molded, stamped or vacuum formed (depending on the embodiment) from thermo-plastic resins, such as (polyethylene terephthalate (PET), high-density polyethylene (HDPE), low-density polyethylene (LDPE), polypropylene (PP), and polystyrene (PS). When the container is opened by the end user, the floating scoop retainer disk and scoop assembly can be removed from the container, the scoop removed from the retainer disk, and the retainer disk discarded. Thereafter, the scoop can be parked using its downward projection or fin within the granulated or powdered product while the container is stored with the lid secured on pantry shelves. Three embodiments of the floating scoop retainer disk are disclosed.

Figure 36:
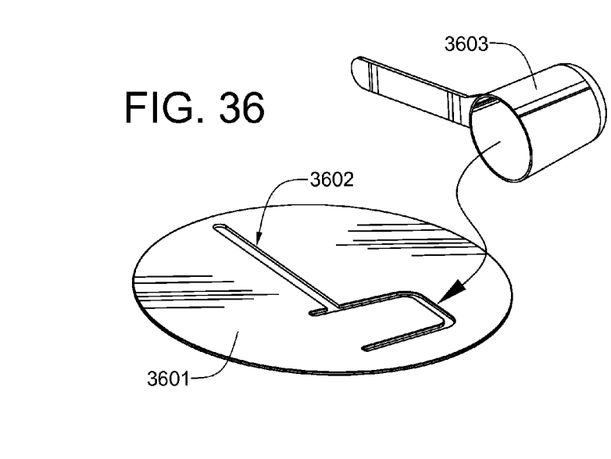
FIG. 36 is an exploded isometric view of a scoop and a first embodiment floating scoop retainer disk.

Referring now to FIG. 36, a first embodiment floating scoop retainer disk 3601, which is molded or stamped from a semi-flexible thermoplastic polymer material, has a scoop outline 3602 cutout therein. The flexible nature of the disk 3600 allows it to be flexed in order to install a scoop 3603 within the outline cutout 3602. It will be noted that the scoop 3603 is shown as being generic in nature, and having no downward parking projection thereon.

Figure 37:
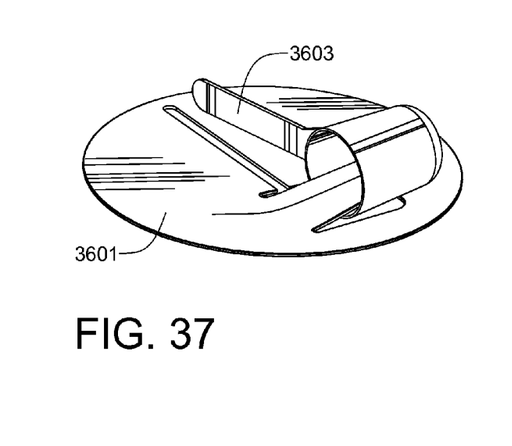
FIG. 37 is an isometric view of an assembly which includes a scoop and the first embodiment floating scoop retainer disk.

Referring now to FIG. 37, the generic scoop 3603 is shown partially installed within the scoop outline cutout 3602 in the disk 3601.

Figure 38:
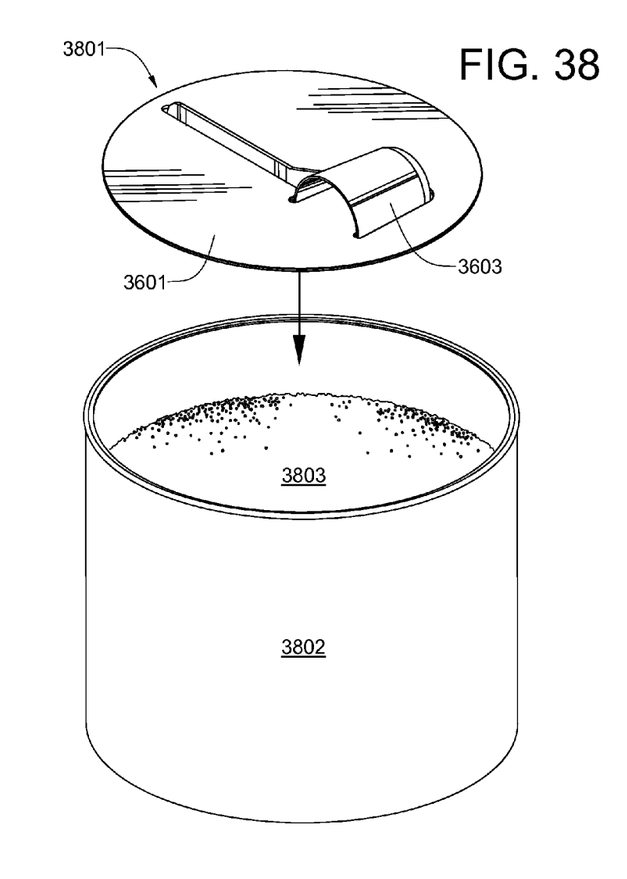
FIG. 38 is an isometric view of an open cylindrical container partially filled with a granulated or powdered product and having an assembly, which includes a scoop and a first embodiment floating scoop retainer disk ready for installation on top of the granulated or powdered product.

Referring now to FIG. 38, the first embodiment disk/scoop assembly 3801, which includes the first embodiment floating scoop retainer disk 3601 and the generic scoop 3603, is shown ready for placement within a cylindrical container 3802 that is partially filled with a granulated or powdered food product 3803.

Figure 39:
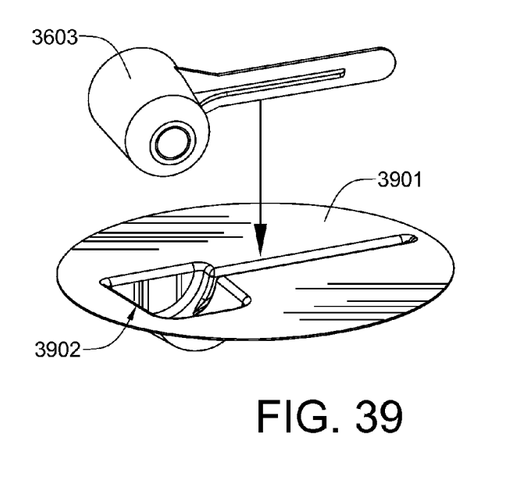
FIG. 39 is an exploded isometric view of a scoop and a second embodiment floating scoop retainer disk.

Referring now to FIG. 39, a second embodiment floating scoop retainer disk 3901, which is injection molded or vacuum formed a semi-rigid thermoplastic polymer material, has a form-fitting recess 3902 in which the scoop 3603 can be inserted with either a non-interference or interference fit.

Figure 40:
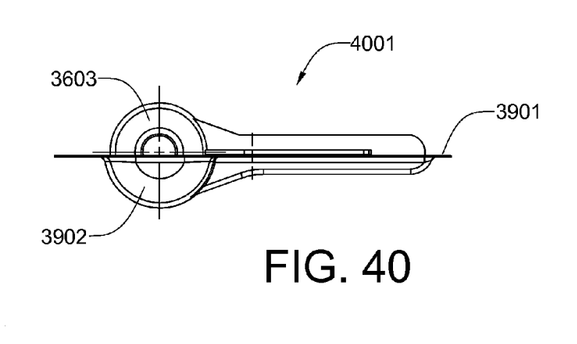
FIG. 40 is an isometric view of an assembly which includes a scoop and the second embodiment floating scoop retainer disk.

Referring now to FIG. 40, the generic scoop 3603 is shown installed within the form-fitting recess 3902 of the second embodiment floating scoop retainer disk 3901, resulting in a second embodiment disk/scoop assembly 4001.

Figure 41:
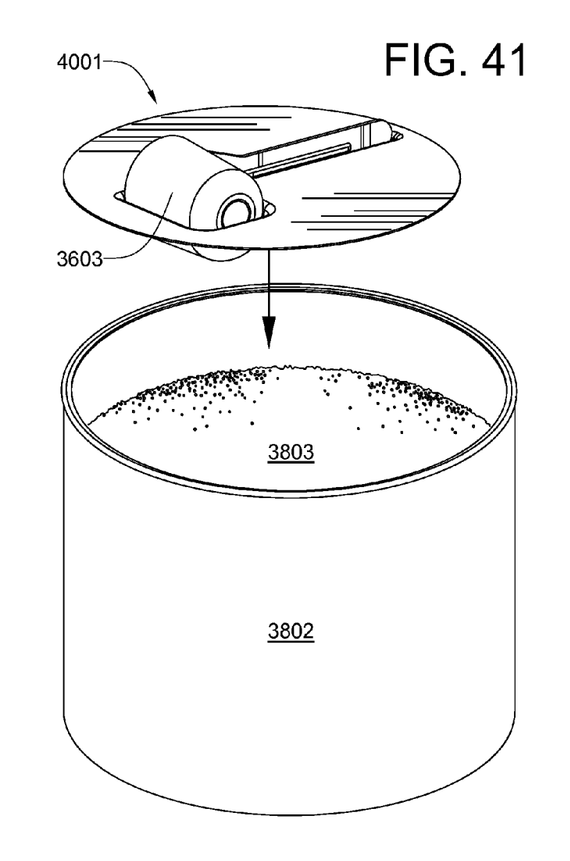
FIG. 41 is an isometric view of an open cylindrical container partially filled with a granulated or powdered product and having an assembly, which includes a scoop and a second embodiment floating scoop retainer disk ready for installation on top of the granulated or powdered product.

Referring now to FIG. 41, the second embodiment disk/scoop assembly 4001, which includes the second embodiment floating scoop retainer disk 3901 and the generic scoop 3603, is shown ready for placement within a cylindrical container 3802 that is partially filled with a granulated or powdered food product 3803.

Figure 42:
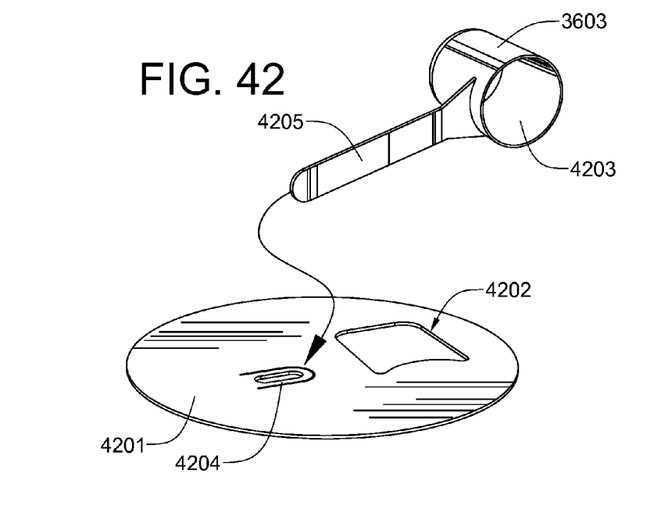
FIG. 42 is an exploded isometric view of a scoop and a third embodiment floating scoop retainer disk.

Referring now to FIG. 42, a third embodiment floating scoop retainer disk 4201, which is molded or stamped from a semi-flexible thermoplastic polymer material, has a cutout 4202 for the cup portion 4203 of the scoop 3603 and an upwardly-bendable loop 4204, which secures the scoop handle 4205.

Figure 43:
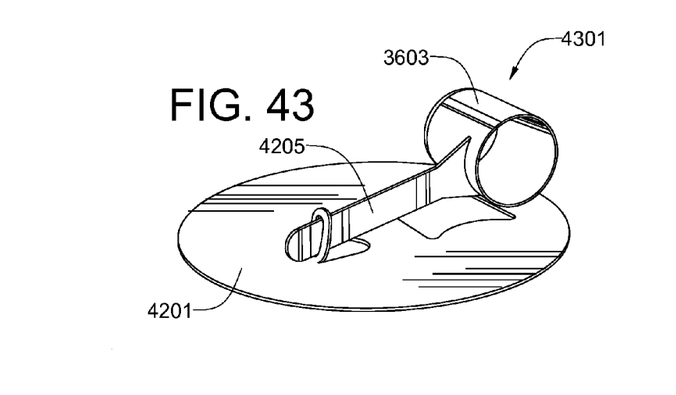
FIG. 43 is an isometric view of an assembly which includes a scoop and the third embodiment floating scoop retainer disk.

Referring now to FIG. 43, the generic scoop 3603 is shown secured to the third embodiment floating scoop retainer disk 4201, resulting in a third embodiment disk/scoop assembly 4301.

Figure 44:
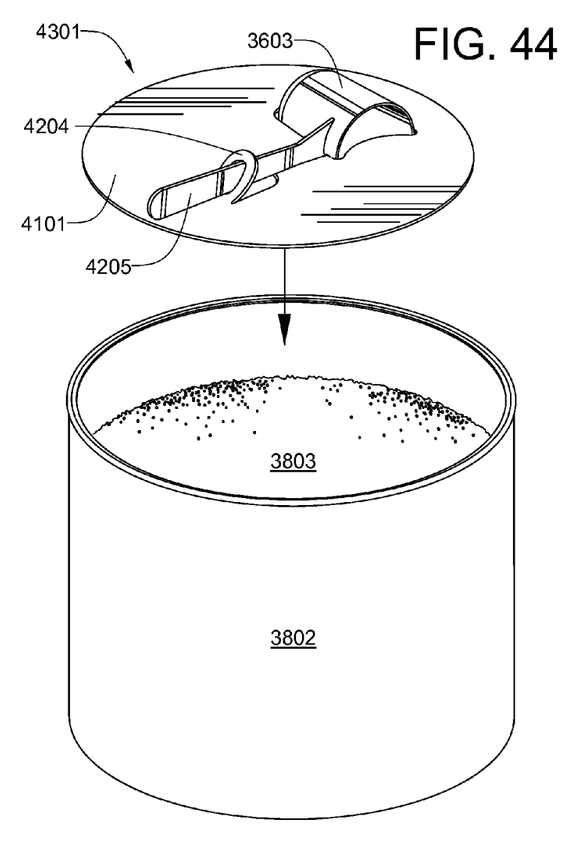
FIG. 44 is an isometric view of an open cylindrical container partially filled with a granulated or powdered product and having an assembly, which includes a scoop and a third embodiment floating scoop retainer disk ready for installation on top of the granulated or powdered product.

Referring now to FIG. 44, the third embodiment disk/scoop assembly 4301, which includes the third embodiment floating scoop retainer disk 4201 and the generic scoop 3603, is shown ready for placement within a cylindrical container 3802 that is partially filled with a granulated or powdered food product 3803.

A combination of the various floating scoop retainer disks is also possible. For example, a retainer disk may, like the second embodiment retainer disk 3901, have a recess for the cup portion of the scoop 3603, and an upwardly bendable loop 4204, like the third embodiment retainer disk 4201, for securing the scoop handle.

Although only several embodiments of the new scoop for measuring and dispensing powdered or granular material have been disclosed herein, it will be obvious to those having ordinary skill in the art that changes and modifications may be made thereto without departing from the scope and spirit of the invention as may hereinafter be claimed.

What is claimed is:

1. A scoop for measuring and dispensing granular or powdered food product comprising:
   a cup portion;
   a handle unitary with the cup portion that extends a lateral distance from an upper edge of the cup portion; and
   at least one vertically-oriented laminar fin, unitary with the cup portion, that projects outwardly and downwardly from a lower exterior surface of the cup portion, said at least one laminar fin enabling the scoop to be parked within the granular or powdered food product with said at least one laminar fin embedded within the food product so that the scoop handle is not in contact therewith.

2. The scoop of claim 1, wherein said laminar fin is coincident with a central axis of the cup portion.

3. The scoop of claim 1, wherein a plurality of laminar fins intersect each other at a common vertical axis, and wherein an outermost edge of each laminar fin begins at about an outer perimeter of the cup and transitions to a lowermost point thereof with a single convex curve.

4. The scoop of claim 1, wherein said at least one laminar fin has a generally vertical orientation, and extends from an exterior surface of the cup portion on a side of the cup portion spaced apart from the handle.

5. In combination with the scoop of claim 1, a discardable floating scoop retainer disk to which the scoop is secured, whereby the scoop retainer disk and scoop assembly are inserted within the top of a container containing a granulated or powdered food product at the time the product is packaged, and said retainer disk prevents the scoop from sinking below an upper surface of the granulated or powdered food product during shipping and handling.

6. The combination of claim 5, wherein said retainer disk comprises a laminar disk made of semi-flexible thermoplastic material, said disk having a scoop outline cutout therein within which the scoop is securable.

7. The combination of claim 6, wherein said recess provides an interference fit with the scoop.

8. The combination of claim 5, wherein said retainer disk comprises a laminar disk made of semi-rigid thermoplastic material, said laminar disk having a recess therein in which the scoop can be inserted and retained.

9. The combination of claim 5, wherein said recess provides a noninterference fit with the scoop.

10. The combination of claim 5, wherein said retainer disk is manufactured using a process selected from the group of processes consisting of injection molding and vacuum forming.

11. The combination of claim 5, wherein said retainer disk comprises a laminar disk made of semi-rigid thermoplastic material, said laminar disk having a cutout for the cup portion of the scoop and an upwardly-bendable loop, which secures the scoop handle.

12. The combination of claim 11, wherein said retainer disk is stamped from laminar sheet thermoplastic material.

13. The combination of claim 5, wherein said retainer disk comprises a laminar disk made of semi-flexible thermoplastic material, said laminar disk having a recess for the cup portion of the scoop and an upwardly-bendable loop, which secures the scoop handle.

14. The combination of claim 13, wherein said retainer disk is manufactured using a process selected from the group of processes consisting of injection molding, vacuum forming and stamping.

15. A scoop for measuring and dispensing granular or powdered food product comprising:
   a cup portion;
   a handle unitary with the cup portion that extends a lateral distance from an upper edge of the cup portion; and
   a single vertically-oriented laminar fin, unitary with the cup portion, that projects downwardly from a lower exterior surface of the cup portion, said laminar fin enabling the scoop to be parked within the granular or powdered food product with said fin at least partially embedded within the food product so that the scoop handle is not in contact therewith.

16. The scoop of claim 15, wherein said laminar fin is coincident with a central axis of the cup portion.

* * * * *